3,009,916
ALPHA-PHASE DIHYDROQUINACRIDONE
William S. Struve, Chatham, N.J., assignor to E. I. du Pont de Nemours and Company, Wilmington, Del., a corporation of Delaware
Filed Jan. 24, 1958, Ser. No. 711,021
1 Claim. (Cl. 260—279)

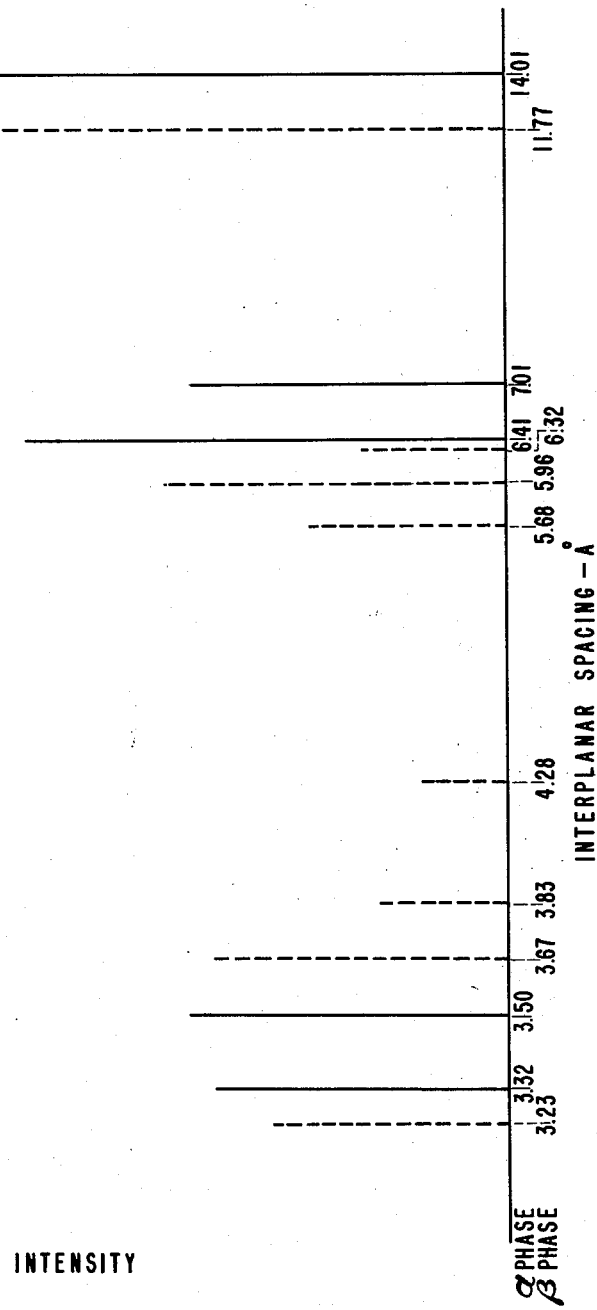

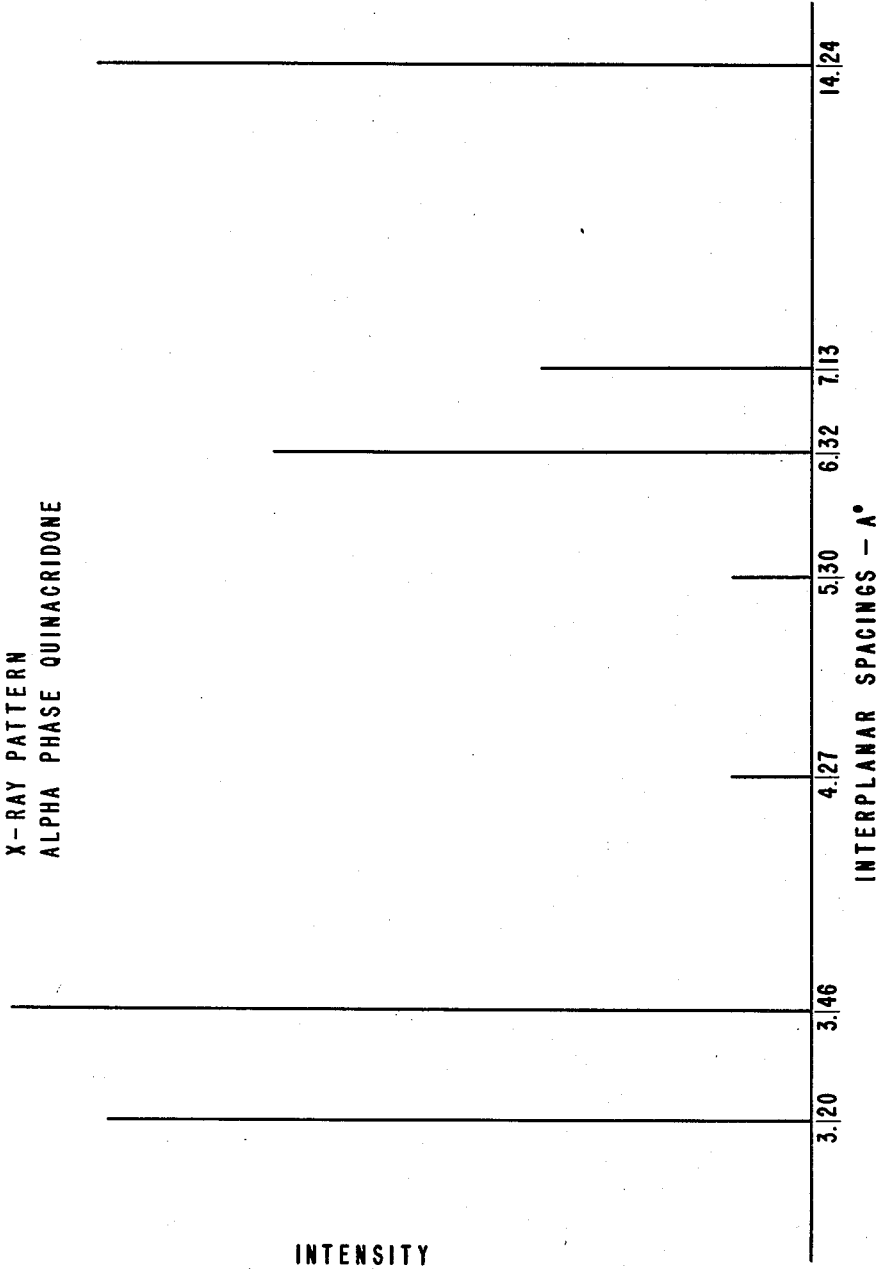

This invention relates to dihydroquinacridone in a new crystal phase, and this application is a continuation-in-part of my copending application Serial No. 523,922, filed July 22, 1955, now U.S. Patent No. 2,821,529.

A process for preparing dihydroquinacridone is described in application Serial No. 523,922, and it involves the cyclization of a dialkyl 2,5-diarylamino-3,6-dihydro-terephthalate by heating the latter compound in an inert, high-boiling liquid. The reaction, which may be referred to as either a cyclization or a pyrolysis reaction, may be illustrated by the following equation:

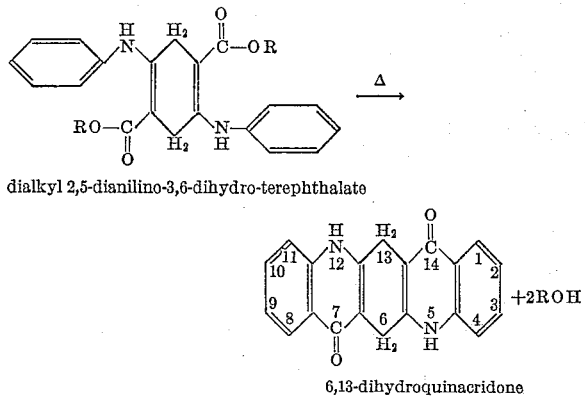

dialkyl 2,5-dianilino-3,6-dihydro-terephthalate 6,13-dihydroquinacridone 6,13-dihydroquinacridone, or simply dihydroquinacridone as it is more often called, is useful in the production of quinacridone pigments as more fully described in the application referred to above. The present invention concerns dihydroquinacridone in a new and useful crystal phase known as the alpha crystal phase. A copending application Serial No. 711,020, filed January 24, 1958, is directed to the beta crystal phase.

Referring to the accompanying drawings, FIG. 1 shows the characteristic X-ray diffraction patterns for alpha and beta crystal phase dihydroquinacridone. FIG. 2 shows a characteristic X-ray diffraction pattern for alpha crystal phase quinacridone—a product which may be produced from the material of this invention. The horizontal axis of the graph shows the interplanar spacings of the crystal, and the vertical axis is an approximation of the relative intensities. As the solid vertical lines of FIG. 1 show, alpha crystal phase dihydroquinacridone is characterized by 5 strong lines of which the most intense line corresponds to an interplanar spacing of 14.01 A. and the other 4 lines correspond to interplanar spacings of 7.01 A., 6.41 A., 3.50 A. and 3.32 A. The X-ray diffraction patterns presented in this specification are based on the conventional powder technique using the Cu K-alpha radiation with the diffraction intensity being recorded with a Geiger counter as a curve in which the horizontal axis shows the angle of diffraction and the vertical axis shows the intensity of the diffraction. For purposes of record, the angle of diffraction has been converted by the use of standard tables to interplanar spacings in Angstrom units which are independent of instrument variations. The values given are accurate to within 2%, and in most cases, variation is less than 1%. Therefore, cognizance should be taken of the variance when interpreting the specification and the claim.

Alpha crystal phase dihydroquinacridone is a light-colored substance of a pale salmon or tan shade. It is insoluble in aqueous alkali even at alkali concentrations of 10–20%. It is also insoluble in water, dilute mineral acids, alcohol, acetone, acetic acid and hydrocarbon solvent. It is completely soluble in concentrated sulfuric acid to give a yellowish to reddish brown solution. Dilution of the solution with water reprecipitates the original dihydroquinacridone without chemical change.

The alpha crystal phase dihydroquinacridone of this invention can be easily converted to a quinacridone pigment having high tinctorial value and excellent resistance to acids, alkali and organic solvents by a simple oxidation which removes hydrogen atoms in the manner indicated below:

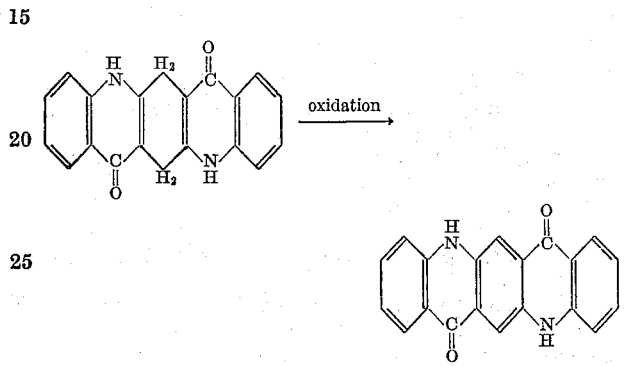

A particularly significant characteristic of alpha crystal phase dihydroquinacridone is that this weakly colored material may be oxidized in a medium which has no perceptible solvent effect upon the material to produce alpha crystal phase quinacridone—an intensely colored bluish-red material exhibiting the X-ray diffraction pattern shown in FIG. 2. This pattern is characterized by two intense lines quite close together with interplanar spacings of 3.46 A. and 3.20 A., a third line of similar intensity with an interplanar spacing of 14.24 A., two lines of moderate intensity with interplanar spacings of 6.32 A. and 7.13 A., and two weak lines with interplanar spacings of 5.30 A. and 4.27 A. For example, if alpha crystal phase dihydroquinacridone is suspended in a sodium hydroxide/ethyl alcohol/water mixture of such concentration that there is no appreciable solubility of the dihydroquinacridone, the dihydro material can be oxidized with nitro benzene-m-sodium sulfonate to alpha crystal phase quinacridone. This oxidation is shown in Example II below.

The preparation of alpha crystal phase dihydroquinacridone is accomplished by heating a dialkyl 2,5-dianilino-3,5-dihydroterephthalate containing from 1–3 carbon atoms in the alkyl group in an inert, high boiling liquid or heat transfer medium. The heating is carried out in the absence of oxygen at temperatures in the range of 225–300° C. for a period ranging from ¾ of an hour to 3 hours. A particularly suitable heat transfer medium for carrying out the reaction is a eutectic mixture of biphenyl and diphenyl oxide. However, many other inert, relatively high boiling liquids can also be used as the medium for carrying out the reaction. The principal consideration, aside from inertness, is boiling point. The liquid should have a boiling point above the temperature at which the reaction is to be carried out, yet it should not be so high as to preclude its removal from the reaction mixture by distillation. Examples of suitable materials include α-methyl naphthalene, β-methyl naphthalene, biphenyl, diphenyl oxide, diethyl phthalate and mineral oils boiling within the range of 225–300° C. as well as mixtures of these materials.

An alternative method for preparing alpha crystal phase dihydroquinacridone is by solution of beta crystal phase dihydroquinacridone in concentrated sulfuric acid and reprecipitation of the alpha crystal phase by dilution with a large volume of water. As previously mentioned, beta crystal phase dihydroquinacridone is described in copending application Ser. No. 711,020. It may be prepared by carrying out the cyclization of diethyl-2,5-dianilino-3,6-dihydro terephthalate in tetramethylene sulfone as the heat transfer liquid. The procedure is substantially the same as that described in Example I of this specification wherein cyclization is carried out in a mixture of biphenyl and diphenyl oxide to produce the alpha crystal phase product.

For a clearer understanding of the invention, the following specific examples are given. These examples are intended to be merely illustrative of the invention and not in limitation thereof. Unless otherwise specified all percentages and parts are by weight.

Example I

A suitable vessel for carrying out the first steps of the process of this invention is a glass-lined reactor equipped with an efficient agitator, a distillation column and a product condenser above the column. The vessel should be jacketed for control of temperature by circulation of a suitable heat transfer liquid. It should also be equipped for the application of a vacuum through the condenser system and for sweeping the atmosphere in the vessel with an inert gas.

250 parts of a mixture comprising 23.5% biphenyl and 76.5% diphenyl oxide is charged to a vessel of this description and of such a size that it will not be more than about one-third filled. The contents of the vessel are heated to about 120° C. and oxygen purged from the vessel by sweeping with nitrogen gas, then applying vacuum and relieving the vacuum with nitrogen gas. Then, 10.35 parts of sodium metal cut into small pieces is added and the charge is allowed to stand without agitation until the sodium is melted, whereupon the vessel is agitated vigorously to break up the molten sodium into small pellets. The charge is then cooled to 55–60° C. maintaining an atmosphere of nitrogen at all times. With the agitator running, 24 parts of anhydrous ethyl alcohol (denatured with 5% methanol) is then added slowly (over a period of about 6 hours) at such a rate that the temperature does not exceed about 75° C. After the addition of the alcohol, the temperature is maintained at 70–80° C. for about two hours. Then, 50 parts of diethyl succinate is added rapidly and the charge heated to 95–100° C. over a 2½ hour period and held at 95–100° C. for about seven hours, maintaining good agitation and an atmosphere of nitrogen at all times. The time of this heating period is not especially critical, and equally good results have been obtained at 14 hours. However, for ease of operation a period of 6–8 hours is preferred. The charge is then neutralized by adding a slurry of 40 parts sodium bicarbonate in about 200 parts of water at about 50° C., stirring for about 20 minutes, letting stand until an aqueous layer forms in the bottom of the vessel and drawing off the aqueous layer. The charge is then washed with a solution of 50 parts sodium carbonate in 300 parts of water at about 70° C. and the aqueous layer again withdrawn from the bottom of the vessel. 160 parts of aniline is then added to the charge, followed by the addition of 0.55 part of aniline hydrochloride. Vacuum is then applied to the water-cooled product condenser. With air circulating through the jacket of the distillation column, the charge is heated to 100–110° C. and the vacuum maintained at 34–35 mm. mercury absolute pressure while heating is continued for three hours. Any aniline carried over with the water given off by the condensation is replaced. At the end of the heating period the vacuum is relieved with nitrogen gas, the charge is cooled below 60° C. and a solution of 0.25 part sodium carbonate in 5.5 parts of water is added and stirred for about 15 minutes. Vacuum is again applied and the temperature is maintained below 60° C. until all water is removed. The charge is then heated to about 140° C. at a pressure of 25 mm. mercury and distillation continued at a maximum temperature of 143° C. for about 6 hours until the aniline content of the distillate is less than 0.20%. The vacuum is then relieved with nitrogen gas to give a solution of about 49.6 parts of diethyl 2,5-dianilino-3,6-dihydro terephthalate in the mixture of biphenyl and diphenyl oxide (85% of theory based on diethyl succinate used).

This solution is then heated with agitation at 250–257° C. for one hour while maintaining an atmosphere of nitrogen gas in the reaction vessel. The charge is cooled nearly to room temperature and diluted with about 100 parts of denatured ethyl alcohol. The product is then separated by filtering and washing with ethyl alcohol. 34 parts of pale tan colored dihydroquinacridone is obtained which is insoluble in aqueous alkali, alcohol, acetone and benzene. It dissolves in concentrated sulfuric acid to give a yellowish to brownish solution from which it is reprecipitated unchanged on dilution. It is stable without melting or decomposition at temperatures up to about 400° C. except for a tendency to oxidize to red quinacridone when heated in the air.

This product exhibits an X-ray diffraction pattern characterized by five strong lines of which the most intense corresponds to an interplanar spacing of 14.01 A. and the others correspond to interplanar spacings of 7.01 A., 6.41 A., 3.50 A. and 3.32 A. It has been designated the alpha crystal phase of dihydroquinacridone to distinguish it from the other crystal phase of dihydroquinacridone which is referred to as the beta crystal phase.

The following example is illustrative of the oxidation of alpha crystal phase dihydroquinacridone to alpha crystal phase quinacridone.

Example II 10 parts by weight of 6,13-dihydroquinacridone (such as was produced in Example I),
200 parts of denatured alcohol (Formula 2B ethyl alcohol with 0.5% benzene),
25 parts of water,
20 parts of nitrobenzene-m-sodium sulphonate,
4 parts of sodium hydroxide 100% (as 20% solution)

are charged to a flask and heated at reflux for 2 hours. After cooling somewhat, the product is filtered off, washed with hot alcohol and then with hot water until alkali free, and dried. 9.6 parts of bright red alpha crystal phase quinacridone is obtained. This product is described in copending application Serial No. 523,699. It exhibits an X-ray diffraction pattern characterized by two strong lines corresponding to an interplanar spacing of 3.46 A. and 3.20 A., a third line of similar intensity with an interplanar spacing of 14.24 A., two lines of moderate intensity with interplanar spacings of 6.32 A. and 7.13 A., and two weak lines with interplanar spacings of 5.30 A. and 4.27 A.

In addition to the use previously mentioned for alpha crystal phase dihydroquinacridone, it is also useful in the preparation of beta crystal phase dihydroquinacridone, as more fully described in copending application Ser. No. 711,020. This beta phase dihydroquinacridone is in turn easily converted into valuable quinacridone pigments.

Since it is obvious that many changes and modifications can be made in the above-described details without departing from the nature and spirit of the invention, it is to be understood that the invention is not to be limited to said details except as set forth in the appended claim.

I claim:

As a composition of matter, alpha crystal phase 6,13- dihydroquinacridone having the following structural formula

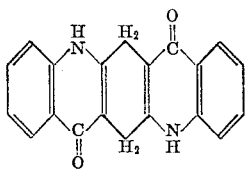

and characterized by an X-ray diffraction pattern exhibiting 5 strong lines of which the most intense corresponds to an interplanar spacing of 14.01 A. and the other 4 lines correspond to interplanar spacings of 7.01 A., 6.41 A., 3.50 A. and 3.32 A.

References Cited in the file of this patent

UNITED STATES PATENTS

| | | |
|---|---|---|
| 2,821,530 | Struve | Jan. 28, 1958 |
| 2,844,484 | Reidinger et al. | July 22, 1958 |
| 2,844,485 | Struve | July 22, 1958 |
| 2,844,581 | Manger et al. | July 22, 1958 |

OTHER REFERENCES

Pendse et al.: J. Indian Chemical Soc., vol. 9 (1932), pp. 67–70.

Liebermann: Annalen, 518, pp. 245, 251 and 252 (1935).